May 13, 1952     W. P. MURPHY, JR     2,596,819

CHANGE-SPEED APPARATUS

Filed July 13, 1951     3 Sheets-Sheet 1

Inventor
William P. Murphy Jr.
by Roberts, Cushman & Grover
Atty

May 13, 1952  W. P. MURPHY, JR  2,596,819
CHANGE-SPEED APPARATUS
Filed July 13, 1951  3 Sheets-Sheet 2

Inventor
William P. Murphy Jr.
by Roberts, Cushman & Grover
Att'ys

May 13, 1952  W. P. MURPHY, JR  2,596,819
CHANGE-SPEED APPARATUS
Filed July 13, 1951  3 Sheets-Sheet 3

Inventor
William P. Murphy Jr.
by Roberts, Cushman & Grover
Attys

Patented May 13, 1952

2,596,819

UNITED STATES PATENT OFFICE 2,596,819

CHANGE-SPEED APPARATUS

William P. Murphy, Jr., Dover, Mass., assignor to Harvard Apparatus Company, Inc., Dover, Mass., a corporation of Massachusetts Application July 13, 1951, Serial No. 236,586

9 Claims. (Cl. 74—353)

This invention relates to change-speed apparatus generally and particularly to change-speed apparatus for driving a kymograph, objects of the invention being to provide apparatus which is simple and economical in construction, which involves gears of only a few sizes, which will afford a wide range of speed ratios, which can be adjusted quickly and easily to any desired speed and which is durable and reliable in use.

In one aspect the apparatus comprises a carrier movable along a predetermined path through a succession of operative positions, pairs of drive gears mounted on the carrier to rotate about adjacent axes, the gears of each pair being coaxial and interconnected to rotate together and one gear being larger than the other, the pairs being arranged in a row with the small gear of each pair meshing with the large gear of the next pair, in combination with a rotor and rotor gears for driving the rotor, the rotor gears being adjacent to the path of movement of the drive gears when the carrier is moved so that the larger drive gear of each pair meshes with one of the rotor gears in each operative position of the carrier. With a reciprocating carrier the drive gears are arranged in a straight row along one side of the carrier, and with a rotary carrier the drive gears are mounted in a row concentric with the axis of the carrier to rotate about axes parallel to the carrier axis. Preferably there are two rotor gears interconnected with the rotor to drive the rotor in the same direction when the two gears are driven in opposite directions by different driving gears.

In another aspect the drive gears on the carrier are driven at different speeds by any suitable means and the apparatus comprises means for automatically disengaging the rotor and drive gears while the carrier is being moved from one operative position to another. This means preferably comprises an actuator for moving the carrier from one operative position to another, together with a lost-motion connection between the actuator and carrier so that the initial movement of the actuator is relative to the carrier, and means responsive to this initial movement for disengaging the drive and rotor gears. The apparatus also preferably has means for automatically returning the actuator to its normal neutral position when the actuator is released, thereby to permit the rotor gear to engage in the newly selected drive gear. In the preferred embodiment the carrier and actuator have surfaces to hold the rotor gear retracted while the carrier is being moved from one position to another, each surface having recesses distributed along the carrier like the drive gears, a controller for retracting the rotor gear and followers on the controller for engagement with the aforesaid surfaces, the carrier surface having a recess to receive its follower when the carrier is in each of said operative positions, and the actuator surface having a recess to receive its follower when the actuator is in said neutral position and the carrier is in each of said operative positions, whereby the rotor gear is retracted in response to the aforesaid initial movement and remains retracted until the actuator is released after the carrier has been moved to an operative position.

For the purpose of illustration a typical embodiment of the invention is shown in the accompanying drawings in which—

Figure 1:
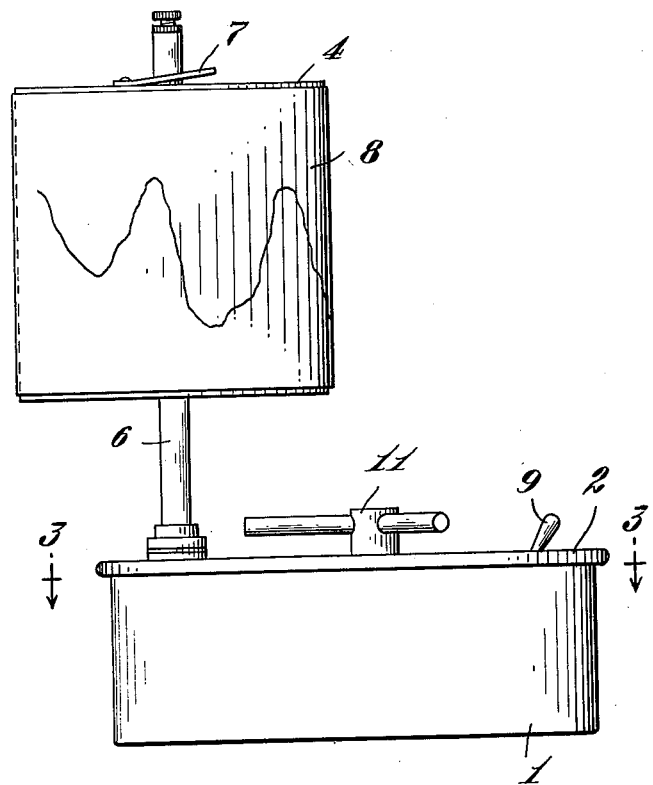
Fig. 1 is a side elevation.
Figure 2:
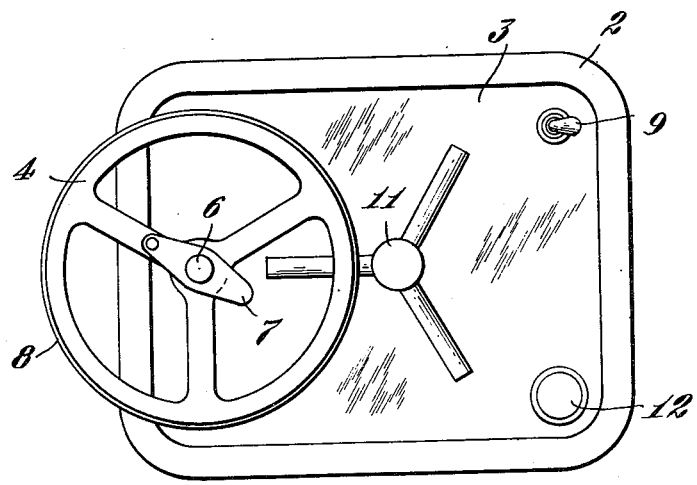
Fig. 2 is a top plan view.

The particular embodiment of the invention chosen for the purpose of illustration comprises a casing 1, a cover 2 having a transparent window 3, a rotor 4 mounted on a shaft 6 by means of a spring 7 which holds the rotor on the shaft at any desired elevation. The spring is biased to spring upwardly to grip the shaft; to shift the rotor upwardly or downwardly it is merely necessary to depress the free end of the spring to disengage it from the shaft. On the outside of the rotor a band 8 of paper or other recording material may be mounted in the usual way. Projecting through openings in the transparent cover are a starting switch 9 and a handle 11 for changing speeds. The transparent cover is also provided with another opening to receive a colored bulls-eye over a pilot light to indicate when the switch 9 is closed.

Figure 4:
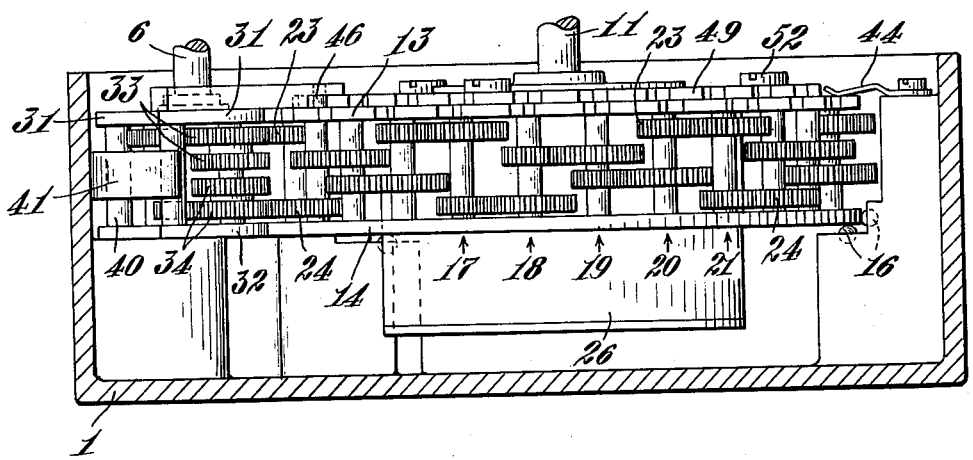
Fig. 4 is a side elevation of the parts shown in Fig. 3 with the casing in section.
Figures 9, 10:
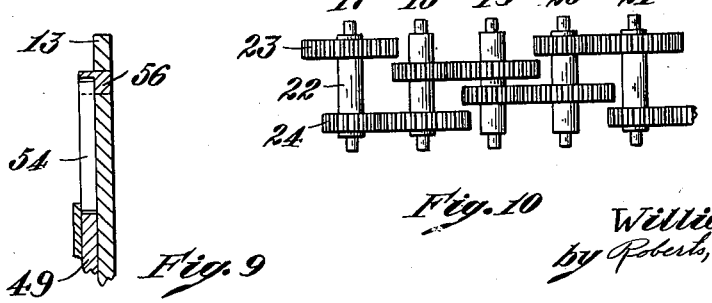
Fig. 9 is a section on line 9—9 of Fig. 5.
Fig. 10 is a view like Fig. 4 showing only the pairs of driving gears, the pairs being arranged in a straight row instead of a circular row as in the other figures.

Inside the casing 1 is a rotary carrier comprising upper and lower disks 13 and 14 secured together to rotate in unison, the carrier being supported by ball bearings at intervals about its periphery as indicated at 16 in Fig. 4. Distributed around the periphery of the carrier intermediate the upper and lower plates are pairs of gears 17, 18, 19, 20, 21, etc., the gears in each being fast to a shaft 22 which is journaled at its upper and lower ends in the upper and lower plates 13 and 14. Each pair of gears comprises a large gear 23 and a small gear 24 (Figs. 4, 8 and 10) the small gear of each pair meshing with the large gear of the next succeeding pair. The gears of successive pairs are spaced differently so that only one gear of each pair meshes with the gear of the next succeeding pair. By arranging the gears as shown in Figs. 4 and 10 so that the arrangement of every fifth pair is the same, the succession of pairs can continue indefinitely with the gears disposed at only four different levels. With the gear ratio of one to two between each two meshing gears the second pair rotates twice as fast as the first, the third pair four times as fast, and so on in geometrical progression. The pairs of gears are driven in unison at the different speeds by means of a motor 26 (Figs. 4 and 8) mounted on the bottom of the bottom plate 14, and a series of gears 27, 28, 29 and 30 interconnect the motor with the large gear 23 of the first pair 17.

Figure 3:
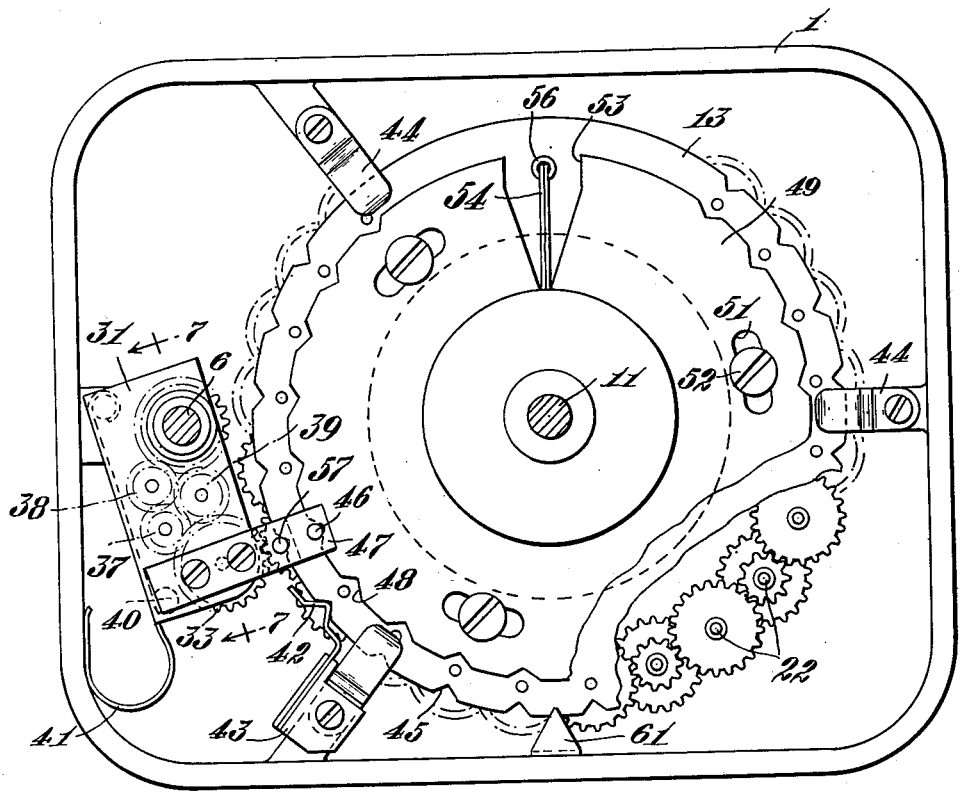
Fig. 3 is a top plan view on a larger scale with the cover removed and parts shown in section.
Figure 6:
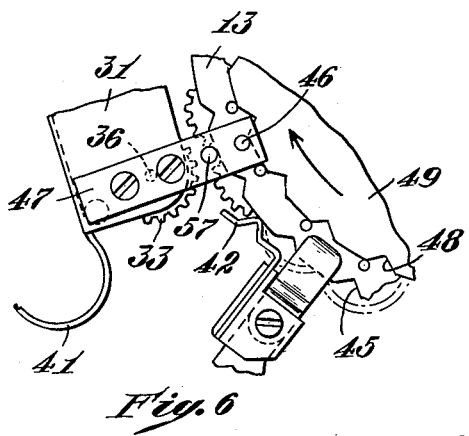
Figs. 5 and 6 are views like Fig. 3 showing the parts in positions which they occupy while changing from one speed to another.
Figure 7:
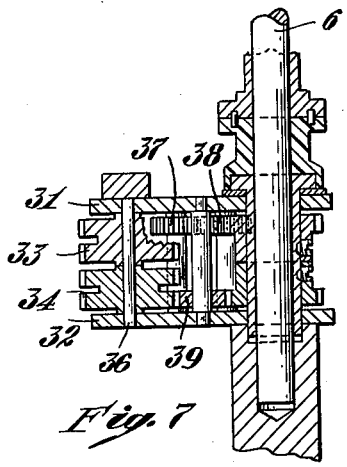
Fig. 7 is a section on line 7—7 of Fig. 3.

The rotor shaft 6 is driven by the larger gear of any one of the aforesaid pairs of drive gears by means of a series of rotor gears mounted between two plates 31 and 32 journaled to swing about the rotor shaft. The rotor gears comprise two gears 33 and 34 which are journaled on a shaft 36 (Figs. 6 and 7) to rotate freely at the same level as the gears on the driving pairs 17, etc. The upper gear 33 is interconnected to a gear fast to the rotor shaft through two intermediate gears 37 and 38 (Fig. 3) whereas the lower rotor gear 34 is interconnected with a gear on the rotor shaft through a single gear 39. Thus the rotor is turned in the same direction by the gears 33 and 34 when rotating in opposite directions respectively, and the larger gears 23 of successive pairs of driving gears engage the rotor gears 33 and 34 respectively so that the rotor always turns in the same direction irrespective of the particular pair of driving gears to which it is connected at any time. As shown in Fig. 3 a spring 41 fast to post 40 between plates 31 and 32 yieldingly urges the rotor gears 33 and 34 into position for one of them to mesh with the larger gear 23 of the particular pair of driving gears which are opposite the rotor gears at the time.

For the purpose of holding the rotary carrier 13—14 in adjusted position, with a pair of driving gears opposite the rotor gears 33 and 34, a spring 42 engages in notches 45 in the periphery of the upper disk 13 of the carrier (Figs. 3, 5, and 6), the spring being mounted on one of three brackets 43 distributed around the carrier. The notches in the periphery of the disk 13 are spaced the same as the driving gears so that when the spring 42 snaps into a notch a pair of driving gears is opposite the rotor gears.

Figures 5, 8:
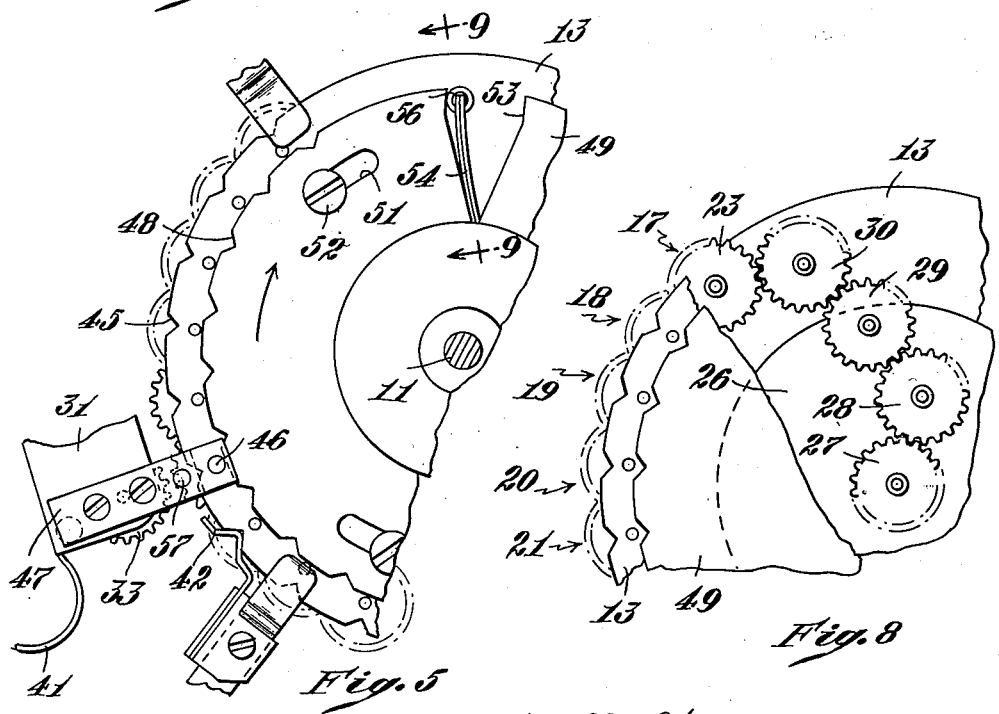
Fig. 8 is a view like Figs. 3, 5 and 6 showing the parts broken away.

Before shifting the carrier from one position to another to change the speed of the rotor, the rotor gears are first disengaged from the driving gears. This is accomplished by a controller having a cam follower in the form of a pin 46 mounted in an arm 47 fast to the plate 31 and extending downwardly for engagement in notches 48 in the periphery of an actuator 49 rotatably mounted on shaft 12 immediately above the carrier plate 13. The actuator is provided with circumferential slots 51 with screws 52 extending through the slots and threaded into the carrier plate 13. At one side the actuator is provided with a peripheral recess 53 in which is disposed a spring 54, the outer end of the spring being mounted on the carrier plate 13 by means of a post 56 and the inner end of the spring engaging in the crotch in the inner end of the notch 53. Thus the spring 54 normally holds the actuator in the central neutral position shown in Fig. 3 but by turning the handle 11 the actuator may be shifted either clockwise or counterclockwise until the ends of the slots 51 engage the screws 52 as shown in Fig. 5. When the actuator is thus shifted it cams the pin 46 outwardly to the position shown in Figs. 5 and 6 in which position the rotor gears are disengaged from the driving gears. The frictional resistance of the springs 44 on the upper surface of the carrier 13 is sufficient to prevent the carrier from rotating until the ends of slots 51 engage the screws 52, whereupon the carrier turns with the actuator 49. While the two are rotating together the notches 45 in the carrier are offset from the notches 48 in the actuator and a second depending cam-follower pin 57 on the arm 47 engages the periphery of the carrier 13 while the notches 48 pass the pin 46, thereby keeping the rotor gears retracted until the carrier comes to rest in an operative position and the actuator returns to neutral position. When the carrier reaches an operative position the spring 42 snaps into the corresponding recess 45 in the carrier and when the handle 11 is released the spring 54 shifts the actuator 49 relatively to the carrier from the position shown in Fig. 5 to the central neutral position shown in Fig. 3, whereupon the rotor gears are free to snap into mesh with the larger gear of the opposite pair of driving gears in response to the spring 41.

From the foregoing it will be evident that a very wide range of speeds can be obtained with very small apparatus. Indeed the illustrated apparatus will afford a range from one revolution per second to one revolution per day. Moreover any desired change in speed may be made merely by shifting the handle 11 clockwise or counterclockwise a predetermined number of steps. The carrier 13 may be calibrated with numbers cooperating with a pointer 61 (Fig. 3) to indicate the speed to which the apparatus is adjusted.

It should be understood that the present disclosure is for the purpose of illustration only and that this invention includes all modifications and equivalents which fall within the scope of the appended claims. For example, instead of mounting the pairs of driving gears on a rotary carrier they may be mounted on a reciprocating carrier in which case the pairs of driving gears are arranged in a straight row as in Fig. 10 instead of a circular row as in the other figures.

I claim:

1. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another and a lost-motion connection between the actuator and carrier so that the initial movement of the actuator is relative to the carrier, and means responsive to said initial movement for disengaging said drive and rotor gears.

2. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another and a lost-motion connection between the actuator and carrier to permit the actuator to be moved relatively to the carrier from a neutral position to an operative position, means responsive to said relative movement for disengaging said drive and rotor gears, and means for automatically returning the actuator to said neutral position when the actuator is released, thereby to permit said rotor gear to engage the newly selected drive gear.

3. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another and a lost-motion connection between the actuator and carrier to permit the actuator to be moved relatively to the carrier in either direction from a central neutral position to an operative position, means responsive to said relative movement for disengaging said drive and rotor gears, and means for automatically returning the actuator to said neutral position when the actuator is released, thereby to permit said rotor gear to engage the newly selected drive gear.

4. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another and a lost-motion connection between the actuator and carrier so that the initial movement of the actuator is relative to the carrier, surfaces on the carrier and actuator respectively to hold said rotor gear retracted while the carrier is being moved from one position to another, each surface having recesses distributed along the carrier like the drive gears, a controller for retracting said rotor gear, and followers on the controller for rotor gear, and followers on the controller for engagement with said surfaces, the carrier surface having a recess to receive its follower when the carrier is in each of said operative positions, and the actuator surface having a recess to receive its follower when the actuator is in said neutral position and the carrier is in each of said operative positions, whereby the rotor gear is retracted in response to said initial movement and remains retracted until the actuator is released after the carrier has been moved to an operative position.

5. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another, a brake affording frictional resistance to movement of the carrier, a lost-motion connection between the actuator and carrier to permit initial movement of the actuator relatively to the carrier from a neutral position to an operative position, a spring for automatically returning the actuator to said neutral position when the actuator is released, the spring being weaker than said brake so that the carrier does not move until the end of said initial movement, surfaces on the carrier and actuator respectively to hold said rotor gear retracted while the carrier is being moved from one position to another, each surface having recesses distributed along the carrier like the drive gears, a controller for retracting said rotor gear, followers on the controller for engagement with said surfaces, the carrier surface having a recess to receive its follower when the carrier is in each of said operative positions, and the actuator surface having a recess to receive its follower when the actuator is in said neutral position and the carrier is in each of said operative positions, whereby the rotor gear is retracted in response to said initial movement and remains retracted until the actuator is released after the carrier has been moved to an operative position.

6. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another, and a lost-motion connection between the actuator and carrier so that the initial movement of the actuator is relative to the carrier and in the same direction as the carrier, and means responsive to said initial movement for disengaging said drive and rotor gears.

7. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another, and a lost-motion connection between the actuator and carrier to permit the actuator to be moved relatively to the carrier in the same direction as the carrier from a neutral position to an operative position, means responsive to said relative movement for disengaging said drive and rotor gears, and means for automatically returning the actuator to said neutral position when the actuator is released, thereby to permit said rotor gear to engage the newly selected drive gear.

8. Apparatus of the character referred to comprising a carrier movable in either direction along a predetermined path through a succession of operative positions, drive gears mounted in a row at successive locations along said carrier to rotate about adjacent axes, means for rotating the gears at the different locations at different speeds, a rotor, rotor gears for driving the rotor, the rotor gears being adjacent the path of movement of said drive gears when the carrier is moved so that a drive gear meshes with a rotor gear in each operative position of the carrier, an actuator for moving the carrier from one operative position to another and a lost-motion connection between the actuator and carrier to permit the actuator to be moved relatively to the carrier in either direction along said path from a central neutral position to an operative position, means responsive to said relative movement for disengaging said drive and rotor gears, and means for automatically returning the actuator to said neutral position when the actuator is released, thereby to permit said rotor gear to engage the newly selected drive gear.

9. Apparatus of the character referred to comprising a carrier movable along a predetermined path through a succession of operative positions, drive gears mounted in a row at successive locations along said carrier to rotate about adjacent axes, means for rotating the gears at the different locations at different speeds, a rotor gear adjacent the path of movement of said drive gears when the carrier is moved so that a drive gear meshes with the rotor gear in each operative position of the carrier, an actuator for moving the carrier from one operative position to another and a lost-motion connection between the actuator and carrier so that the initial movement of the actuator is relative to the carrier and in the same direction as the carrier, surfaces on the carrier and actuator respectively to hold said rotor gear retracted while the carrier is being moved from one position to another, each surface having recesses distributed along the carrier like the drive gears, a controller for retracting said rotor gear, and followers on the controller for engagement with said surfaces, the carrier surface having a recess to receive its follower when the carrier is in each of said operative positions, and the actuator surface having a recess to receive its follower when the actuator is in said neutral position and the carrier is in each of said operative positions, whereby the rotor gear is retracted in response to said initial movement and remains retracted until the actuator is released after the carrier has been moved to an operative position.

WILLIAM P. MURPHY, Jr.

REFERENCES CITED

The following references are of record in the file of this patent:

UNITED STATES PATENTS

| Number | Name | Date |
|---|---|---|
| 812,888 | Shannon | Feb. 20, 1906 |
| 922,880 | Garvin et al. | May 25, 1909 |

FOREIGN PATENTS

| Number | Country | Date |
|---|---|---|
| 314,084 | Italy | Jan. 16, 1935 |